April 12, 1955  A. G. SCHRAMM  2,706,009
ELEVATABLE BED AUTOMOTIVE VEHICLES
Filed June 8, 1951  2 Sheets-Sheet 1
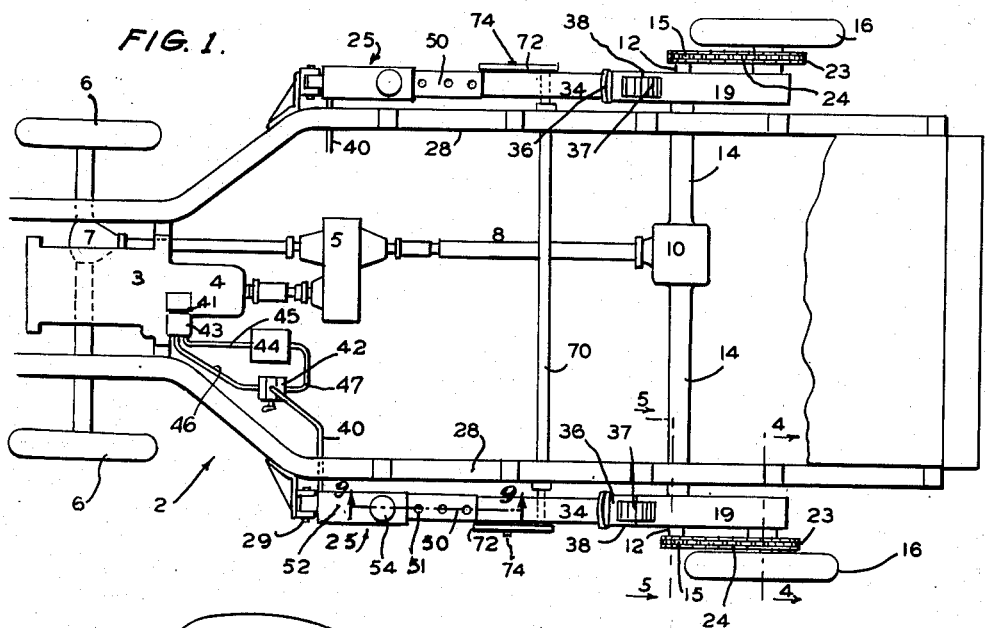
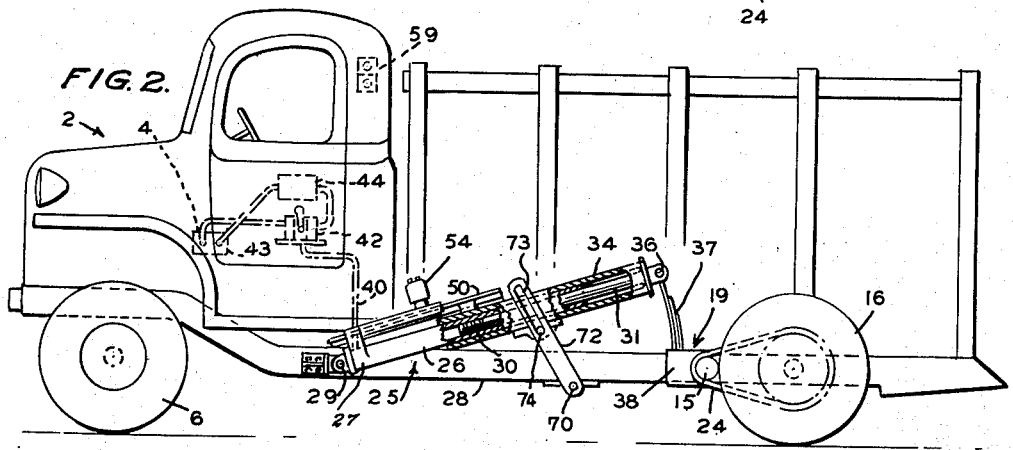
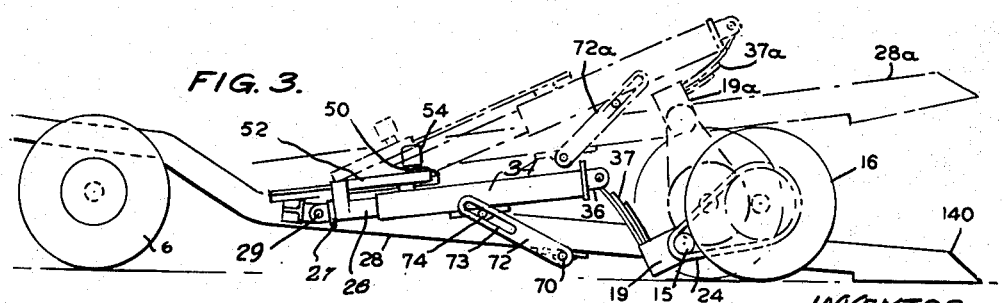
INVENTOR
ARTHUR G. SCHRAMM
BY Scott L. Nowrie
ATTORNEY

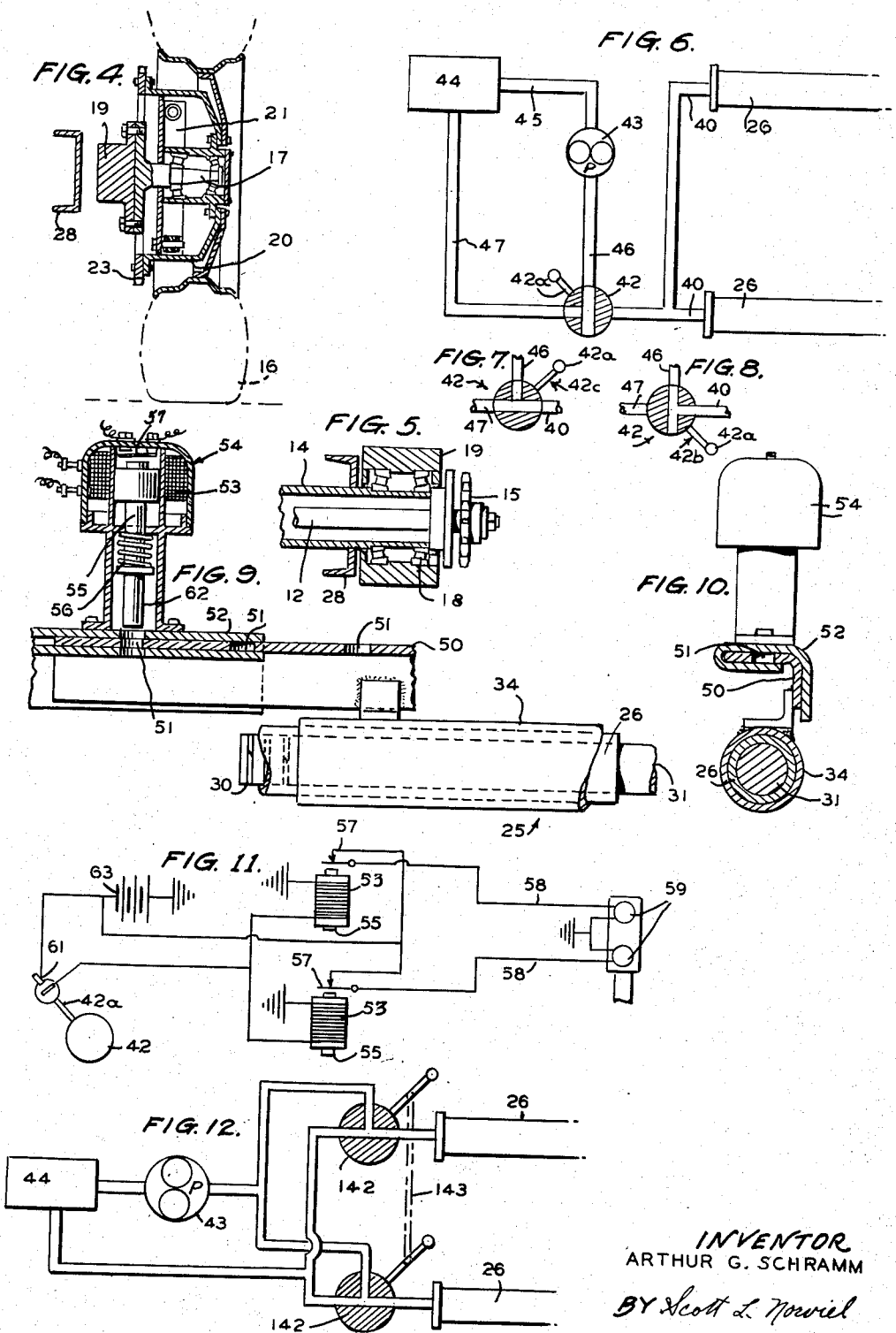

United States Patent Office 2,706,009
Patented Apr. 12, 1955

2,706,009

ELEVATABLE BED AUTOMOTIVE VEHICLES

Arthur G. Schramm, Phoenix, Ariz.

Application June 8, 1951, Serial No. 230,669

3 Claims. (Cl. 180—41)

This invention pertains to elevatable bed automotive vehicles.

One of the objects of the invention is to provide an automobile vehicle which has rear driving wheels resiliently supported on movable crank arms arranged so that the driving wheels can be raised or lowered with reference to the vehicle frame without impairing resilient support whereby the bed of the vehicle may be raised or lowered relative to the ground.

Another object is to provide an elevatable bed motor vehicle with rear driving wheels supported on crank arms resiliently connected to hydraulic pistons operating in cylinders supplied with fluid under pressure controllable from the driving compartment of the vehicle so that they may be raised and lowered with reference to the vehicle bed and with latches so that they may be rocked in any desired position by means controllable from said vehicle driving compartment.

Another object is to provide, in a vehicle of the type above described, a means for independently hydraulically operating each wheel crank arm and with separate mechanical mechanism for forcing both arms to work together to prevent lateral unbalancing of loads in said vehicle body.

Another object is to provide an electrical signaling system operating in conjunction with said latching means for holding said crank arms in fixed position so that a visible signal is produced in said driving compartment whenever said latching means is disconnected and rendered inoperative so that the operator will be warned not to move the lifting mechanism beyond determined limits.

Still another object is to provide a hydraulic lifting mechanism for a vehicle, as above described, wherein the vertical supporting effort of each rear drive wheel may be separately controlled from the driving compartment, so that laterally unbalanced loads may be controlled and the vehicle bed maintained level regardless of weight distribution thereon.

Other objects will appear hereinafter.

I attain the foregoing objects by means of the apparatus, parts and combination of parts shown in the accompanying drawings in which—

Figure 1 is a plan view of a motor vehicle incorporating my improvements;

Figure 2 is a side elevation thereof with the rear wheels and related parts shown in riding position;

Figure 3 is a side elevation of the vehicle frame in lowered loading position with the related moving parts shown in corresponding positions in solid lines, and with the position of the bed and related parts shown in elevated loading position by dotted lines;

Figure 4 is a mid-sectional elevation of one of the rear wheel hubs taken substantially on line 4—4 Figure 1 and drawn on an enlarged scale;

Figure 5 is mid-sectional view of one of the wheel arm bearings taken substantially on lines 5—5 Figure 1 and drawn on an enlarged scale;

Figure 6 is a semi-diagrammatic view of the oil pressure pump and oil control valve in riding position;

Figure 7 is a diagrammatic view of the oil control valve in lowering position;

Figure 8 is a diagrammatic view of the oil control valve in raising position;

Figure 9 is a semi-diagrammatic mid-sectional elevational view of one of the electrically operated latch mechanisms taken on line 9—9 of Figure 1;

Figure 10 is an end elevation thereof;

Figure 11 is an electrical diagram of the latch solenoid operating circuit and signal system to indicate when the latch armature is retracted; and Figure 12 is a semi-diagrammatic plan view of an arrangement of parts, including the pump and lifting cylinders shown in Figure 1, by which each lifting cylinder may be operated separately.

Similar numerals refer to similar parts in the several views.

The vehicle 2 is driven by motor 3 through gear shift box and clutch 4, and transfer case 5 in order to drive the front wheels 6 in the usual manner through a suitable front differential 7. The rear wheel drive shaft 8 extends from transfer case 5 rearwardly to conventional rear differential gearing operating within differential housing 10. From this differential gearing jack shafts 12 extend laterally of the vehicle and are journalled near their outer ends in the tubular housings 14 extending outward from each side of differential housing 10. Sprockets 15 are attached to the outer ends of these jack shafts.

Rear wheels 16 on each side of vehicle 2 are supported on stub shafts 17 extending outward, laterally, from the outer end portions of wheel arms 19. Each of these wheels is attached to a standard brake drum 20. These drums are journalled on shafts 17. Large sprockets 23 are attached to the inner edges of these drums and are driven from sprockets 15 by chains 24. Standard hydraulically operated brake shoes 21 operate within drums 20.

Near the upper end portions, arms 19 are bored and provided with suitable bearings 18 which bear on the outer ends of tubular jack shaft housings 14. At the upper end portions of arms 19 and beyond bearings 18, boxes 38 are constructed to bed quarter elliptical springs 37. These springs extend at right angles to the length of the wheel arms 19. When the arms 19 are in horizontal riding position, as shown in Figure 2, these springs extend upward.

Each of the springs 37 is operated so as to swing each of the wheel arms 19 on its supporting bearing 18 by hydraulic mechanisms or jacks 25. Each of these mechanisms includes a cylinder 26 having a closed head 27 positioned forwardly and an open end facing toward the rear. Each cylinder head 27 is pivotally attached to vehicle frame 28 by a hinge pin 29 positioned forward of said spring. A piston 30 operates in each cylinder 26 at the inner end of a large piston rod 31. The rear end of the piston rod is secured to the guide sleeve 34 which extends rearward over cylinders 26 in slidable relation thereon so that the sliding movement of the piston rods produces the rearward sliding movement of the guide sleeves on the cylinders 26. A clevis 36 is attached to the rear end of each guide sleeve 34 and this is hinged to the upper end of each spring 37.

Oil under pressure is supplied to cylinders 26 through flexible tubes 40 which connect to operating valve 42. Pump 43, driven by power take off gear and mechanism 41, attached to and driven from gear box 4, operates continuously whenever power take off mechanism is put in gear. Pump 43 draws oil from reservoir 44 through tube 45, and forces it to valve 42 through tube 46. When valve 42 is in neutral or riding position, as shown in Figure 6, the oil returns to reservoir 44 through return tube 47 and tubes 40 are closed. Valve 42 is arranged as shown in Figure 8, so that when its operating handle 42a is pushed to the forward position 42b oil under pressure from tube 46 is connected to tubes 40 and applied to cylinders 26 so that piston rods 31 will be forced outward from cylinder 26. When the valve handle is moved to the rear position, 42c, Figure 7, tubes 40 are connected to oil return tube 47 and oil is let out of cylinders 26. At the same time oil from tube 46 is shunted to tube 47 to relieve the pressure from tube 46. In the form of the device shown in Figures 1 and 2 oil pressure is applied to, or removed from both cylinders equally when valve 42 is operated.

To latch and maintain wheels 16 in running position a slide bar 50 is secured to sleeve 34 and is provided with latch holes 51. When the piston of either cylinder is in the intermediate or retracted position this bar slidably engages a guide channel 52 which is attached to the head portion of cylinder 26, as shown in Fig. 9. On the upper side of this channel there is an electric solenoid latch 54. The armature 55 of this latch is normally extended to latching position by spring 56. In this position it extends outward and downward through any one of latch holes 51. When the solenoid is energized the armature is retracted into the solenoid and disengages from the latch hole. At the same time the upper end of the armature closes a switch 57 in the upper portion of the solenoid structure. This switch closes a circuit 58, including signal lamps 59 which are conveniently disposed in the driving compartment of the vehicle. There are solenoids operating on each latch guide and each solenoid has a separate indicating lamp. This enables the operator of the vehicle to observe when the armatures of the solenoid latches are retracted and thus indicates when the hydraulic lift is sustained by oil pressure only.

The solenoids 54 are energized by closing the circuit shown in Figure 11. A switch 61 is placed on top of the handle 42a of valve 42 so that it can be operated by the hand of a person grasping the handle. Closing this switch closes the circuit through the windings 53 of each solenoid and vehicle battery 63, so that armature 55 is drawn up into the windings. Since the latching pin 62 is clamped, or cramped, in latch holes 51 when strain is on members 50 and 52 it is necessary to hold the switch 61 closed while oil is applied to cylinders 26, until pin 62 is released or uncramped. When uncramped the latch armature will move to disengaged or retracted position.

To force both of the wheel arms to move together I provide a torsion bar 70 which is journalled transversely beneath vehicle frame 28. At each end of this bar crank arms 72 are fixed on the bar and extend substantially upwardly, as shown in Figure 2. At the upper ends of these bars there are slots 73 which extend lengthwise of the arms and therefore radially relative to the axis of bar 70 to provide slides to receive studs 74 attached to sleeves 34. Studs 74 are positioned on the sleeves so that when the wheels are in running position, as shown in Figure 2 they are above the transverse torsion bar 70. Slots 73 allow movement outward or inward from this position. Whenever the sleeve 34 on the left side of the vehicle is moved forward the crank arm 72 at the left end of torsion bar 70 moves to the position indicated by solid lines in Figure 3. This rotates torsion bar 70 counterclockwise and causes the crank arm 72 at the right end of the torsion bar to move forward a similar degree. Movement of the crank arms rearward to positions indicated by dotted lines 72a accordingly follows the rearward motion of sleeves 34.

Where it is desired to operate both wheel arms, 19, independently the torsion bar 70 is eliminated. Valves 142 are then provided for each of the hydraulic cylinders as shown in Figure 12. The operation of each valve is the same as the single valve 42 so far as oil entry, outlet, and bypass lines is concerned. The handles of the two valves 142 may be arranged so that they may be grasped singly or together as indicated at 143. When the handles are grasped together the wheel arms are raised or lowered together. If the load is heavier on one side than the other, the valve controlling the hydraulic cylinder on the heavy side may be arranged to be operated independently and more tension applied to the spring 37 on the side. Otherwise operation concerning latching and signalling is substantially the same as with the form shown in Figures 1 and 2.

*Operation*

As shown in Figures 1 and 2 the rear wheels 16 of vehicle 2 are in riding position. Pistons 30 and sleeves 34 are in about the mid position of their travel and hold springs 37 upwardly. The solenoid latch 54 is secured in one of the holes 51 in slide 50 necessary to maintain the sleeve in this extended position.

To lower the vehicle frame latch 54 is released by closing switch 61 on handle 42a. After uncramping the latch pin, oil is then allowed to flow from cylinders 26 by moving valve operating handle to the position 42c. The weight of the vehicle then forces the oil out of the cylinders, through valve 42 and on into reservoir 44. When the piston rods 31 retract, sleeves 34 move the upper ends of springs 37 toward the forward end of vehicle 2 to the position indicated by solid lines, Figure 3, and wheel arms 19 move to the position which, similarly shown, in effect, raises the wheels relative to vehicle bed 28 and permits the bed to move to the ground and assume the lowered position indicated in Figure 3. The rear end of the bed then contacts the ground at 140.

If the latches 54 are released and oil forced into cylinders 26 by moving valve handle to position 42b then piston rods 31 and sleeves 34 will be moved rearward of the vehicle and will swing springs 37 to the positions indicated by dotted lines 19a and raises the bed 28 to the elevated position indicated by dotted lines 28a. This elevated position makes it possible to level the rear end of the bed with elevated loading docks.

In the foregoing no detail is shown or described concerning the power take off 41 from gear shift 4 because this is of standard form, well known to the art. The same is true of the oil pump 43, valve 42 or valves 142 and motor and drive of the vehicle 2 so far as differential 10. The hydraulic cylinders or jacks 25 are, per se, similar to those shown in my previous Patent No. 2,453,388.

In addition to the above, however, I have provided mechanism for raising and lowering the bed of a vehicle, such as 2, by mounting the rear driving wheels on the outer ends of arms 19 the inner ends of which are pivotally attached to the vehicle frame on journals concentric with jack shafts extending outward laterally from rear differential 10, and providing hydraulic means for swinging or pivoting these arms and resiliently retaining them in riding. In combining this wheel supporting structure with the hydraulic operating means and applying this combination to a motor vehicle operated by controls in a driving compartment many problems arose, which I I have solved as herein explained and illustrated. In order to limit the outward and rearward extension of sleeves 34, and to force rear wheels 16 toward the ground at the same time I provide the torsion bar or shaft 70 and crank arms 72 which are attached to sleeves 34. The length and position of slots 73 in arms 72 will limit the motion of sleeves 34.

In order to latch the sleeves in any desired riding position, so that their position is independent of the oil pressure, I provide electrically operated latch pins indicated generally by numeral 54. Their operation has been previously described. While the slides through which these latches operate could be extended so that the slides will be held in any position desired, including the high dock loading position, this extension is thought to be ordinarily unnecessary. Several holes 51 are provided so that the wheel arms 19 may be maintained in the most efficient riding position irrespective of the load placed on the vehicle bed.

Further, in order to provide a signal by which the operator can ascertain when the latch pins are released and withdrawn, I provide the electrical signalling system shown in Figure 11 and previously explained.

From the foregoing it will be understood that I have disclosed a mechanism and combination of parts which is very useful in loading and unloading heavy objects from a motor vehicle truck bed. Other uses will be apparent to those familiar with the art. Also, many variations and modifications of the disclosed structure are possible, and many substitutions of the parts shown may be made without departing from the inventive concept disclosed. Therefore the following claims are made in general terms.

I claim:

1. An elevatable bed motor vehicle comprising a frame, wheel arms swingably mounted on each side of the rear portion of said frame, rear riding wheels journaled on the outer ends of said arms, springs fixedly attached to the inner ends of said arms and extending upward at substantially right angles thereto, hydraulic jacks including cylinders pivotally attached to said frame forward of said arms and having pistons hingedly attached to the upper ends of said springs, guide sleeves for said pistons movable on the cylinders and attached to the pistons, latch guides operating between said sleeves and the cylinders including slide bars on said sleeves sliding in guide channels on said cylinders; electrically operating latches mounted on said guide channels having pins latching said slide bars on said sleeves in predetermined positions relative to said guide channels on said cylinders; electrical means for indicating when said latch pins are withdrawn to inoperative position; and a power driven pump on said vehicle frame and connected to said cylinders for supplying oil to said cylinders; a control valve for controlling the pressure of oil from said pump to said cylinders; and a torsion bar journalled transversely in said frame and having crank arms at each end coupled to each of said sleeves to produce a simultaneous movement of said sleeves.

2. In a motor vehicle having a frame, wheel arms rotatably carried by the frame; rear drive wheels mounted on the outer ends of said arms, springs rigidly secured to and extending substantially at right angles to said wheel arms; hydraulic jacks having heads pivotally attached to said frame, cylinders secured to said heads extending from said jack heads toward said springs, pistons and piston rods operating in said cylinders, and guide sleeves attached to the outer ends of said piston rods and slidably operating on the outside of said cylinders, the outer ends of said piston rods being hinged to the outer ends of said springs; latching mechanism including latch slide bars attached to said sleeves and guide channels attached to said cylinder heads slidably receiving the latch slide bars, latch pins mounted on said guide channels adapted to normally engage latch holes in said slide bars, solenoids controlling the latch pins, electrical means for energizing said solenoids when desired to disengage said pins from said holes; electric signaling means energized by said electrical means to indicate when said pins are disengaged from said holes; an oil pump supported on said frame and having an inlet and an outlet adapted to furnish oil under predetermined pressure; a three way valve and connected to said pump and to said cylinders and adapted to transmit oil from said pump outlet to said cylinders in one position, to transmit oil from said cylinders to said pump inlet in a second position, and close said cylinders and bypass oil from said pump inlet to said pump outlet in a third position; and a torsion shaft journalled transversely in said frame and having radially extending crank arms at each end, and means on said guide sleeves attached to the crank arms so that said guide sleeves will move on said cylinders in unison.

3. In an elevatable bed motor vehicle, a vehicle bed, arms pivotally mounted on said vehicle bed, spindles carried by the arms, rear wheels mounted on the spindles, springs fixedly attached to said arms and extending angularly relative to said arms, hydraulically operated cylindrical jack units mounted on each side of said bed and having cylinders with heads pivotally attached to said bed, and slidable piston rod elements hingedly connected to said springs at their outer ends, the combination therewith of mechanism for forcing said piston rod elements to move in unison, including a torsion shaft transversely journalled in said vehicle bed, crank arms on each end thereof having slots at their outer ends, and studs on said piston rod elements slidably received in said slots.

References Cited in the file of this patent

UNITED STATES PATENTS

| | | |
|---|---|---|
| 2,201,179 | Jackson et al. | May 21, 1940 |
| 2,452,267 | Schramm | Oct. 26, 1948 |
| 2,559,758 | De Jouette | July 10, 1951 |

FOREIGN PATENTS

| | | |
|---|---|---|
| 646,448 | Germany | June 23, 1937 |